United States Patent Office 3,600,122
Patented Aug. 17, 1971

3,600,122
METHOD OF GRAFTING ETHYLENICALLY UNSATURATED MONOMER TO A POLYMERIC SUBSTRATE
John H. Coleman, Old Westbury, N.Y., assignor to Surface Aviation Corporation, Westbury, N.Y.
Filed July 1, 1966, Ser. No. 563,931
Int. Cl. D06m 9/00; B44d 1/092, 1/52
U.S. Cl. 8—115.7                        12 Claims This application in part discloses and claims subject matter disclosed and claimed in an earlier filed pending application of the present applicant, P. H. Coleman, Ser. No. 533,509, filed Mar. 11, 1966, and now abandoned.

This invention relates to the initiation of chemical reactions on the surface of a polymeric material by means of a spark discharge, and in particular to the initiation of polymerization reactions on the surface of a polymeric material by means of a spark discharge at substantially atmospheric pressure.

It is often desirable to graft to the surface of a polymer substrate or shaped article a selected grafting material to form a surface modified polymer substrate or article. Surface modification may be desired for a number of reasons, for example, to improve the dyeability, resistance to soiling, resiliency or other properties of the shaped article. Specifically, grafting may be desired in order to improve the dyeability of a polymer film, to improve the anti-static properties, soil repellency, abrasion resistance, wettability and non-wettability of a polymer textile fabric, or to improve the adherability of adhesives, printing inks and the like to the surfaces of shaped polymer articles.

A number of proposals have been made for grafting a selected material to the surface of a polymer substrate or article, some of these being described in Pats. 2,932,591, 3,068,510, and 3,069,283, all assigned to the assignee of this invention. For example, a thin dielectric film can be deposited upon a substrate by exposing the surface of the substrate to a glow-discharge in an atmosphere of organic gaseous material, thereby to polymerize a polymer film on the surface of the substrate. However, it is not always possible or desirable to apply the selective grafting material immediately and in the presence of the glow discharge to the surface of the substrate; for example, the grafting material may not be available in gaseous form, or it may be hazardous to apply the grafting material to the substrate in the presence of a glow discharge, or various manufacturers may desire to apply a wide variety of grafting materials to the same substrate. Thus, it may often be preferred to prepare the substrate for grafting as a first step, followed at a substantially later time by application of the grafting material as a second step.

Of course, it is well known that a polymer substrate can be prepared for grafting by so-called "preirradiation" of the substrate. As described by Y. Shinohara and K. Tomioka in vol. 44, Journal of Polymer Science, page 195 (1960). "Graft Copolymerization by a Preirradiation Method," when a polymer substrate is irradiated for relatively long periods of time by a high energy source such as an electron accelerator or a radioactive source, peroxides and free radicals are formed in the substrate, the peroxides and free radicals inducing subsequent grafting. However, for commercial purposes, electron accelerators and radioactive sources are not well suited because of their expense, complexity, and potential hazard to employees, and because of the relatively long irradiation exposure times required.

In the present invention, there is provided an economical, efficient method and apparatus for rapidly and continuously activating the surface of a polymer for grafting by initiating the formation of free radical sites on the surface of a polymer substrate. The initiation of free radical sites is accomplished by moving the substrate through a so-called "spark discharge" in a first zone containing an initiator gas. The spark discharge is maintained between suitably spaced electrodes by appropriately adjusting the pressure of the initiator gas and the voltage between the electrodes, and the initiator gas is selected to activate the surface of the substrate by forming free radical sites on the surface without the initiator gas itself reacting with the free radical sites thereby formed on the surface. Following activation of the surface, the substrate is moved to a second zone in which the activated surface is exposed to a free radical reactive substance that chemically reacts with the free radical sites. For example, the free radical reactive substance may be a polymerizable monomer that forms a graft copolymer with the substrate. Alternatively, the free radical reactive substance may be oxygen or an oxygen bearing gas that forms peroxides which may be subsequently decomposed by heating at a later time for a subsequent grafting operation in which a graft copolymer is formed with the polymeric substrate.

It has been discovered that the process and apparatus of this invention may be employed either at low pressure or at atmospheric pressure, it being more convenient and economical, of course, to use the process at atmospheric pressure to avoid the elaborate and costly apparatus necessary to maintain a low pressure zone. Also, it has been found that in a preferred mode for the process, the substrate is continuously moved through the spark discharge zone and into a second zone provided with the desired free radical reactive substance, thereby obtaining a highly efficient process especially well suited for in-line operations.

The invention will be fully understood from the following detailed description of illustrative embodiments thereof taken in connection with the appended drawings, in which.

Figure 1:
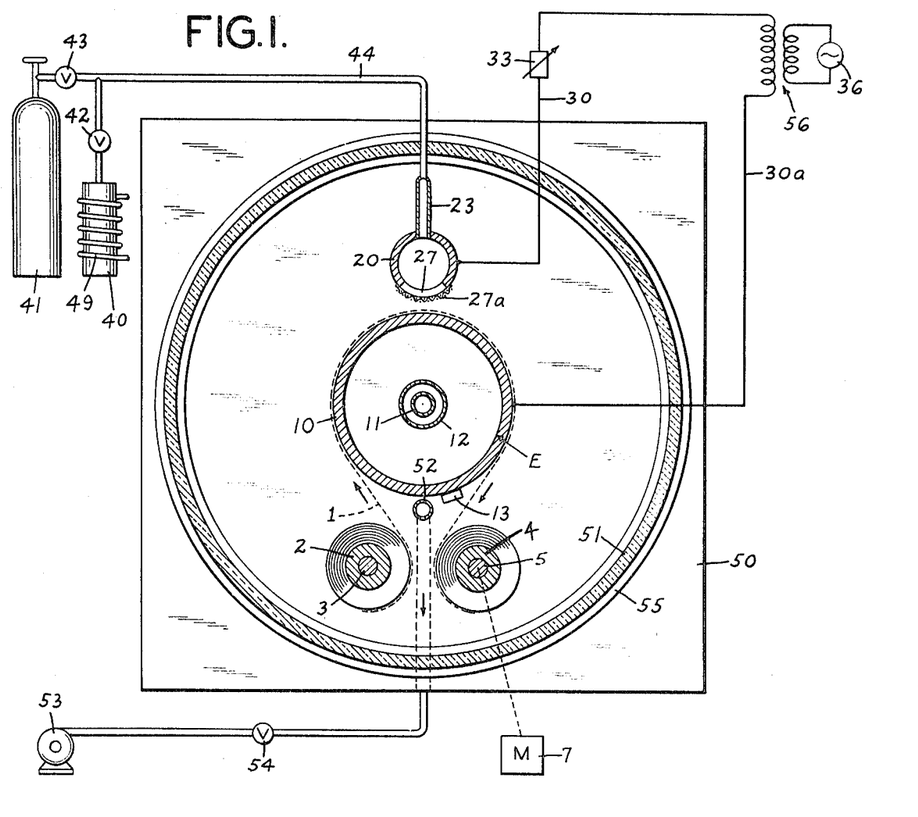
FIG. 1 is a schematic view partially in section of an appartus constructed in accordance with the principles of the present invention.

Referring now to the drawings wherein like reference characters designate like parts throughout the several views, there is shown in FIG. 1 apparatus resembling in certain respects the structure illustrated in FIG. 1 of my copending application, Ser. No. 453,061, filed May 4, 1965. An enclosure 51, for example, a bell jar, is secured to base plate 50 with interposed sealing means 55, for example, a gasket, to provide a hermetically sealed enclosure and thereby maintain a desired gaseous environment within enclosure 51. The pressure within enclosure 51 may be adjusted as desired by connecting port 52 either to the room within which the apparatus is located if atmospheric or greater pressures are desired, or to pump 53 via valve 54 if sub-atmospheric pressures are desired when gases are introduced into enclosure 51.

Inside enclosure 51, there is provided a drum electrode E having a cylindrical surface 10, this electrode comprising, for example, a seamless stainless steel cylinder with closed ends (not shown). A coolant outlet tube 11 extends axially through the interior of electrode E, with a coolant supply tube 12 mounted axially about tube 11 so that a suitable coolant enters the interior of electrode through tube 12 and exits through tube 11. Temperature measuring means 13, for example, a thermometer, shows the surface temperature of surface 10 of electrode E. A cylindrical conductive counter electrode 20 is positioned adjacent electrode E and is provided with an elongated opening 27 covered by a screen 27a which faces surface 10. Screen 27a may be constructed of wire mesh or other suitable material, preferably a conductive material.

Substrate 1 from take-off spool 2 rotatable on shaft 3 is pulled over surface 10 of electrode E by take-up spool 4 whose driveshaft 5 is powered by motor 7. The tension of substrate 1 is adjusted by applying an adjustable drag (not shown) to shaft 3.

A potential difference is applied between electrodes 20 and E by connecting electrodes E and 20 via leads 30 and 30a, respectively, across the secondary winding of high voltage transformer 56 of alternating current power supply 36. Adjustable impedance 33 is provided to prevent destructive sparking and to correct for power factor.

A desired gas or mixture of gases is introduced into the region between electrodes E and 20 by tube 23 which passes through plate 50 and connects with gas supply tanks 40 and 41 via feed line 44 and valves 42 and 43. Either or both of the gases in tanks 40 and 41 may be heated in order to raise the vapor pressure, a suitable heating arrangement being illustrated by heater coil 49 provided for tank 40.

In operation, gas is admitted into enclosure 51 from one or both of the tanks 40, 41 by opening the corresponding inlet valve 42, 43, and the pressure required to maintain a spark discharge zone in the region between electrodes E and 20 is obtained by appropriate adjustment of inlet valves 42, 43, as well as of valve 54 if subatmospheric pressure is employed. For an initiator gas composed of pure hydrogen, visual observation indicates that at sub-atmospheric pressures, diffuse, low pressure glow discharge between electrodes E and 20 ceases above a pressure of about 150 mm. (Hg) and is replaced by a striated high pressure glow discharge in the form of individual sparks from wire mesh 27a.

With a substrate 1 comprising oriented polypropylene film, 10 inches in width, passing through a spark discharge in hydrogen at a linear speed of 0.75 foot per minute, a current of 100 milliamperes was maintained to electrode 20 by adjusting the voltage supplied by power source 36. The required electrode voltage increased from about 1000 volts at a pressure of 150 mm. to 2000 volts at atmospheric pressure. Subsequent to spark discharge treatment of the polypropylene film, air was admitted into enclosure 51 and the polypropylene film was removed and placed in a flask with methacrylic acid and heated for 30 minutes at 85° C. in an inert atmosphere (nitrogen). The sample was removed, dried and placed in a solution of a basic dye, after which the sample was observed to have become dyed a deep red color. The dye could be removed with acid and the sample subsequently re-dyed, indicating that the methacrylic acid had formed a graft copolymer with the polypropylene substrate. A control sample of undischarged polypropylene was placed in the methacrylic acid solution and into the dye along with the discharged sample and no color was observed in the control sample.

A second sample of polypropylene spark discharged in hydrogen was placed in a flask with vinyl pyrrolidone and refluxed at reduced pressure at 85° for 90 minutes. The sample was removed, dried, and placed in a solution of acid dye. A purple color was noted, whereas an undischarged control sample similarly heated with vinyl pyrrolidone and placed in the acid dye had no significant color. Again, the dye could be removed from the treated sample and reapplied, thereby indicating grafting.

Another test was performed to determine the change in wettability effected by the above treatment. This was measured by placing a water drop on the treated surface and observing the angle $\theta$ at the point of contact between the drop and the surface of the film. In the case of polypropylene spark discharged in argon, an angle of $\theta=65°$ was observed, compared to 95° for untreated polypropylene film. Good wettability appears to be a requirement for certain coatings such as those applied with an aqueous base, for example, the commercially available polyvinylidene chloride type to reduce oxygen permeability.

In addition to polypropylene, other materials were spark discharged in enclosure 51 in the manner described above, these materials including polyester film (Celanese Type O), Teflon tetrafluoroethylene film, Aclar fluorocarbon film, Mylar polyester film, and polyethylene film, and textile fabrics made of cotton, Dacron polyester, Nylon polyamide, polypropylene, and cotton-polyester blends. In the treatment of the fabrics it was necessary to place the fabric over a suitable "boot" or web, for example a 0.001 inch polyester film, which acted as an insulating barrier between electrodes E and 20 to prevent excessive sparking through the pores in the fabric. It was found that grafting was obtained to acrylic acid as indicated by the permanence of the red basic dye. It is to be understood, of course, that the spark discharge process of this invention is not limited to the above fabrics but includes other fabrics for which surface activation is desired, such as wool, rayon, and blends of these and other fabrics. Also, if desired, the fibers, yarn or tow from which the above fabrics are woven may be treated instead of the fabrics, or supplementary to treatment of the fabrics.

Figure 2:
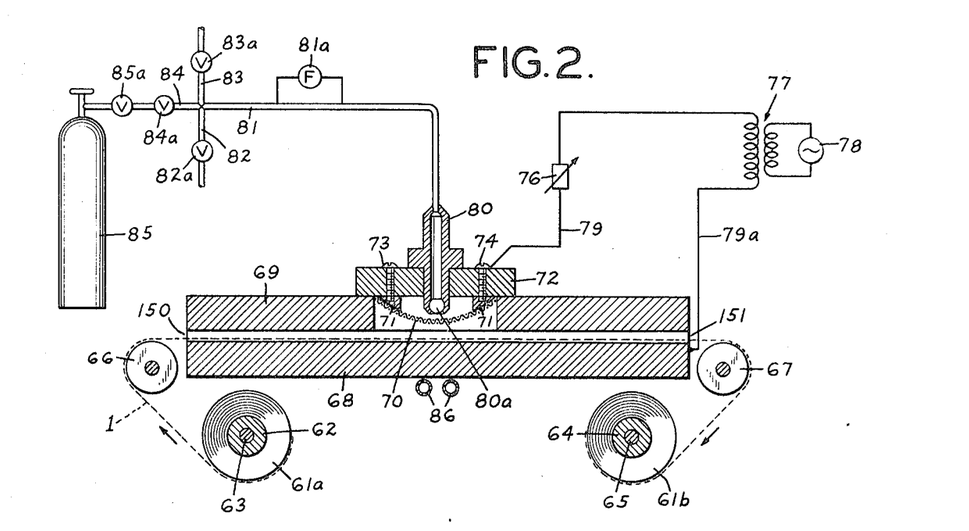
FIG. 2 is a schematic representation, partially in section, of a production type apparatus in which a substrate is moved along a rectilinear path through a spark discharge zone in accordance with the principles of the present invention.

Referring now to FIG. 2, this drawing illustrates a preferred embodiment of the principles of this invention especially adapted for production line processing of a substrate 1. A roll 61a of substrate 1 is unwound from take-off spool 62 on journaled bearing 63 and passed over entrance guide roller 66 through entrance slot 150 onto electrode 68, and re-wound on take-up spool 64 mounted on journaled bearing 65 to form roll 61b after passing through exit slot 151 and over exit guide roller 67. Above electrode 68, which may be a rectangular aluminum plate, there is positioned a rectangular plate 69 constructed, for example, of Lucite polymethylmethacrylate, and counter electrode 70, made for instance in the form of a semicircular wire mesh stretched taut over an aluminum frame 71 secured to plate 72 by screws 73 and 74. Electrode 68 may be cooled or heated as desired by suitable means indicated by coils 86 connected to an external temperature bath (not shown).

A potential difference is applied between electrodes 68 and 70 by connecting one end of lead 79a to electrode 68 and one end of lead 79 to electrode 70, for example, by attaching lead 79 to screw 74, the other ends of leads 79 and 79a being connected across the secondary winding of transformer 77 of power supply 78. Current regulation and power factor correction are provided by adjustable impedance element 76, which may comprise both capacitive and inductive elements.

A selected initiator gas, which as described above in connection with the apparatus shown in FIG. 1, may be either a single gas or a mixture of gases, is injected axially along the length of electrode 70 by nozzle 80a in nippled brass fitting 80 connected to main gas feed line 81. A gas tank 85 with suitable pressure reducing valve 85a feeds gas through valve 84a and line 84 into main gas feed line 81. As indicated by valves 82a and 83a and lines 82 and 83, additional gas supply tanks may be connected to main gas feed line 81, if desired.

By injecting the initiator gas into nozzle 80a at a pressure slightly greater than atmospheric and by adjusting the voltage and current applied to the electrodes 68 and 70, a spark discharge was maintained in a zone between electrodes 68 and 70. Continuous treatment was effected by drawing substrate 1 from spool 62 to spool 64 through the spark discharge zone at selected speeds. A number of different initiator gases were tried under various conditions, and it was unexpectedly discovered that significant activation of the substrate surface was produced by this process. Of particular significance from a commercial point of view was the fact that in the apparatus shown in FIG. 2 the spark discharge was maintained at atmospheric pressure, thereby avoiding the necessity for complex and expensive equipment to maintain low pressure, and tests of substrates passed through the spark discharge zone indicated that substantial activation of the substrate surfaces had been produced by this arrangement.

The discharge, with the electrode saturated, appears to spread about ¼″ around the circumference of the screen electrode (¾″ diameter) and individual sparks are observed to have approximately a ⅜″ separation on the screen surface. On the other hand, when the sparks contact the substrate the discharge spreads laterally over the substrate surface overlapping adjacent discharges thereby effecting uniform surface treatment. In other gases such as hydrogen, smaller separation was observed between sparks; and the most diffuse discharge was observed with helium. Similar results were obtained with rectangular, flat electrodes 10″ x 1″ although there dark spots observed on the electrode surface where no sparking occurred indicating lack of saturation at currents up to 90 ma. Higher current or an insulating boot over the bottom electrode is required to spread the discharge uniformly over larger electrode areas.

The spacing between screen electrode 70 and top surface of substrate as it passes over electrode 68 is 1/16″ to ⅛″. Increasing the separation to 3/16″ to ¼″ required higher voltages, on the order of 1,300 volts for argon, to obtain 90 ma. current. A power supply whose output frequency is below 10 kilocycles is preferred although higher frequencies can be used.

One series of tests was conducted with argon as the initiator gas delivered at a flow rate of 0.5 liter per minute, a ten inch wide substrate 1 moving continuously at a linear speed of one foot per minute, a voltage of 1,300 volts at 8 kilocycles, and a uniform spark discharge current of 100 milliamperes. Several different substrates were passed through the apparatus, including Vycron polyester chafer fabric, polypropylene film, Dacron polyester fabric, and cotton fabric. Each of these materials was inserted in the grafting apparatus described in connection with FIG. 1 (except acrylic acid was used instead of methacrylic) and after removal from the apparatus dyed with the basic dye (Du Pont Sevron Red 4G). In all cases, a deep red color developed which did not wash out, while an untreated control sample developed only slight color. Similar results were obtained with vinyl pyrrolidone grafting with an acid dye. With acrylic acid, the weight increase of the grafted portion to the weight of the untreated substrate varied from a 3% increase for the Dacron polyester fabric to over 100% for polypropylene.

Next, to determine the qualitative effect of various initiator gases on a substrate, transparent Celanar polyester film was used for convenience of optical measurements. The film was discharged in the apparatus of FIG. 2 under the conditions above, grafted, dyed, and passed between a light source and exposure meter to determine dye intensity. To eliminate grafting variables, samples using different gases were placed in the same grafting apparatus (three liter resin flask heated by a 550 watt Glass-col mantle). Commercial grade glacial acrylic acid monomer was used in sufficient quantity to cover all the samples in the flask. Air was carefully purged from the monomer prior to the run and nitrogen $(N_2)$ was bubbled through the monomer during the run to maintain an inert atmosphere.

Dye intensity was measured by using a light source (40 watt GE light bulb) in a box having a 1¾″ aperature over which was placed the sample and light meter (Weston "Photronic"). The light source was adjusted by controlling the applied line voltage so that the incident light or intensity of light transmitted through a blank sample, denoted $I_0$, produced a reading of 100 on the meter. The intensity of light passing through a dyed substrate, denoted I, is therefore less than 100 due to the absorption of light, and the values listed under the heading "Dye intensity" in the following tables represent the amount of light absorbed by the dyed substrate, or $(I_0-I)$.

TABLE 1

| Run | Gas | Current (ma.) | Dye intensity | $100 \log\left(\frac{I_0}{I}\right)$ |
| --- | --- | --- | --- | --- |
| J64A | A | 60 | 54 | 34 |
| J64B | He | 75 | 35 | 19 |
| J64C | $N_2$ | 75 | 15 | 7 |
| J64D | $O_2$ | 75 | 48 | 28 |
| J64E | Air | 75 | 38 | 21 |
| J64F | $H_2$ | 75 | 57 | 37 |

For all gases except argon, hydrogen, and helium, the substrate 1 was punctured by the discharge since voltages were increased from the 1000–2000 volt range used for these gases to above 3000 volts. Therefore an insulating "boot" of ordinary ⅛″ window glass was placed over electrode 68 to limit the energy of each spark. All values in Table 1 were taken with the boot except argon.

As seen from Table 1, hydrogen produced the highest dye intensity. It must be kept in mind, however, that the intensity is believed to be a result of initiation by sites induced on the treated substrate and propagation through the unsaturated monomer. Variations in either step will vary the amount of graft add-on. Therefore the intensity reported in the tables herein should be regarded as a qualitative evaluation of the various discharge gases. In addition, to relate the dye intensity measure given in the tables to the induced site density of the treated substrates, a rating, denoted 100 log $(I_0/I)$ in the tables, is derived by taking the logarithm of the ratio of the incident light, $I_0$, to the light transmitted through a dyed substrate, I, and multiplying the resulting logarithm by a factor of 100. As seen in Table 1, the 100 log $(I_0/I)$ rating shows that hydrogen and argon are substantially better than the other gases.

Next to determine the effect of mixtures of gases, hydrogen was added to several gases and discharged in the apparatus of FIG. 2 under the conditions of Table 1. Note that the absolute values differ in Tables 1 and 2 for hydrogen due to different grafting conditions which affect the propagation step. Therefore, values relative to hydrogen should be considered to be the significant indicator.

TABLE 2

| Run | Gas | Dye intensity |
| --- | --- | --- |
| J65A | $A+H_2$ | 30 |
| J65B | $He+H_2$ | 30 |
| J65C | $N_2+H_2$ | 25 |
| J65D | $Air+H_2$ | 35 |
| J65E | $H_2$ | 40 |

As seen from Table 2, hydrogen is still better than the other gases; it is evident, however, that the ratings of all the other gases are improved by the addition of hydrogen in the discharge when using polyester substrate.

Next, to determine the effect of using another substrate, polypropylene film was used under the same conditions of Table 1 and Table 2 except it was necessary to substitute methacrylic acid for acrylic acid since acrylic acid was found to graft so heavily that many samples became opaque and discrimination was difficult by the optical techniques.

TABLE 3

| Run | Gas | Dye intensity | $100 \log\left(\frac{I_0}{I}\right)$ |
|---|---|---|---|
| J77D | A | 68 | 50 |
| J81A | He | 34 | 18 |
| J81B | $N_2$ | 12 | 6 |
| J81C | $O_2$ | 0-10 | |
| J81D | Air | 0-10 | |
| J78D | $H_2$ | 62 | 42 |

As seen from Table 3, argon produces more grafting than hydrogen, with a polypropylene substrate. This result appears contrary to the results obtained by Bamford, Jenkins and Ward in "The Tesla Coil Method for Producing Free Radicals From Solids," vol. 186 Nature, page 4726 (May 28, 1960), who reported argon was one of the least effective gases, but Bamford et al. used a different mode of discharge (Tesla coil) and low pressure.

From Tables 1–3 it appears as though it is necessary to determine the preferred gas with each substrate.

To determine optimum processing conditions, the parameters were varied over a wide range of values. Variations in current, while holding constant an argon initiator gas flow rate at 0.5 liter per minute and a polyester film substrate linear speed at one foot per minute through the spark discharge zone, and while conducting the processing at room temperature, yielded the following results.

TABLE 4

| Run | Current (ma.) | ½ voltage (v.) | Dye intensity Grafting Run 1 | Dye intensity Grafting Run 2 |
|---|---|---|---|---|
| J71A | 30 | 293 | 15 | 20 |
| J71B | 40 | 360 | | |
| J71C | 50 | 373 | | 41 |
| J71D | 70 | 381 | | 49 |
| J71E | 90 | 402 | 35 | 55 |
| J71F | 110 | 417 | | |
| J71G | 130 | 431 | | 52 |
| J71H | 150 | 448 | 39 | |

Increasing the voltage by about 50% increases the current by 500%, as seen from Table 4, thereby indicating that the relationship between current and voltage is non-ohmic.

Variations in the linear speed of the polyester film substrate through the spark discharge zone, while holding constant the spark discharge current at about 90 ma. and the argon initiator gas flow rate at 0.5 liter per minute, yielded the following results.

TABLE 5

| Run | Speed (feet per minute) | ½ voltage | Dye intensity | $100 \log\left(\frac{I_0}{I}\right)$ |
|---|---|---|---|---|
| J72C | 0.5 | 402 | 41 | 23 |
| J72A | 2.0 | 404 | 36 | 19 |
| J72B | 4.0 | 400 | 29 | 15 |

In Table 5 it is observed that the grafting appears to decrease with increasing speed; however, the decrease is considerably less than the decrease in electrical energy delivered to the substrate surface (voltage×current×contact time), since the voltage and current were held substantially constant. The contact time is proportional to the reciprocal of the linear speed, yet it is seen that in Table 5 an increase in speed by a factor of 8 resulted in a decrease in intensity by less than a factor of 2.

Variation in linear speed of a polyester film substrate for air and argon as the initiator gases, while holding the current constant at about 200 milliamperes, produced the following results:

TABLE 6

| Run | Speed (feet per minute) | Gas | Dye intensity | $100 \log\left(\frac{I_0}{I}\right)$ |
|---|---|---|---|---|
| JHA | 90 | Air | 30 | 16 |
| JHB | 5 | Air | 67 | 48 |
| JHC | 90 | Argon | 61 | 41 |
| JHD | 5 | do | 68 | 49 |

From this table it is evident that at high speed in the practical operating range, argon is considerably more effective than air.

Temperatures were varied with polyester film substrate moving through the discharge zone at one foot per minute, using argon as the initiator gas at 0.5 liter/minute and holding the current constant at about 90 ma., to produce the following results:

TABLE 7

| Run | Temp., ° C. | Dye intensity | $100 \log\left(\frac{I_0}{I}\right)$ |
|---|---|---|---|
| Argon { J83A | −40 | 71 | 54 |
| J63A | Ambient | 71 | 54 |
| J84A | +90 | 56 | 36 |
| Hydrogen { J84B | −40 | 68 | 50 |
| J63B | Ambient | 69 | 51 |
| J84B | +90 | 60 | 40 |

From this table it is apparent that there was no significant difference between −40° C. and room temperature, but that the yield of grafting sites decreased at higher temperatures.

Several other substrates were run under the same discharge conditions as the results reported in Tables 1 through 3, with the following results:

TABLE 8.—FILM SUBSTRATES

| Gas | Du Pont Mylar polyester Dye intensity | Du Pont Mylar polyester $100 \log\left(\frac{I_0}{I}\right)$ | Du Pont Teflon tetrafluoroethylene, weight add-on, percent | Allied Chemical Aclar fluorocarbon Dye intensity | Allied Chemical Aclar fluorocarbon $100 \log\left(\frac{I_0}{I}\right)$ | Polyethylene Dye intensity | Polyethylene $100 \log\left(\frac{I_0}{I}\right)$ |
|---|---|---|---|---|---|---|---|
| Argon | 52 | 32 | 3.2 | 67 | 48 | 62 | 42 |
| Helium | 30 | 16 | None | 48 | 28 | | |
| Nitrogen | 15 | 7 | 0.3 | 40 | 22 | | |
| Oxygen | 48 | 28 | None | 34 | 18 | | |
| Air | 45 | 26 | None | 38 | 21 | | |
| Hydrogen | 56 | 36 | 39 | 78 | 66 | 58 | 38 |

The Mylar polyester grafting results are seen to be similar to the Celanar polyester results in Tables 1 and 2. It is also observed that better results were obtained with hydrogen and argon than with the other gases shown in Table 8.

Wetting angles measured on polyester substrate, which had had an untreated wetting angle of 75° to 80°, and treated under conditions similar to those of Table 1, gave the following values:

TABLE 9

Initiator gas: Wetting angle, percent
Argon _________________________________ 35
Nitrogen _______________________________ 30
Air ____________________________________ 30
Hydrogen ______________________________ 65

In addition, acrylic acid grafted to argon-treated polyester substrate yielded a wetting angle of zero degrees. All samples were washed ten times in distilled water, dried, and re-measured. Re-measurement showed that all angles increased to 75°, which is the untreated value, except the acrylic acid grafted sample which remained zero degrees.

In addition to the above results obtained with the apparatus and method illustrated by FIG. 2, similar results were obtained with polypropylene, and textile fabrics such as cotton, nylon polyamide, Dacron polyester, and Dacron polyester-cotton blends, and polyolefins. Also, it is anticipated that similar results are obtainable with substrates in the form of shaped articles such as bottles made from similar materials. In addition, fibers and nonwoven materials can be drawn through the discharge zone.

Figure 3:
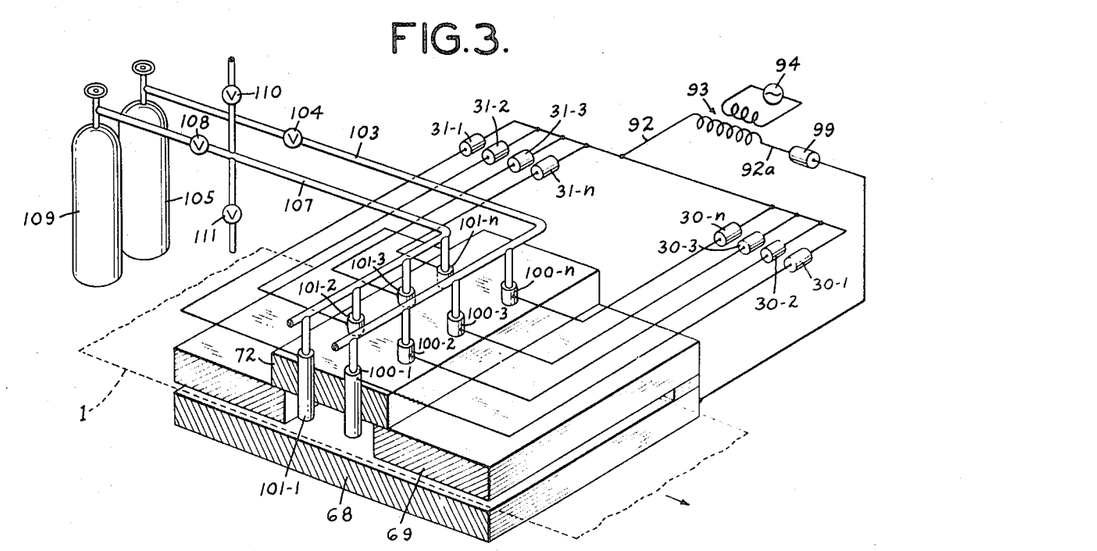
FIG. 3 is a perspective view of an alternative embodiment in which a spark discharge in accordance with the principles of this invention is provided by cylindrical electrodes.

Another embodiment of the principles of this invention is illustrated in FIG. 3, in which the wire screen electrode 70 in FIG. 2 is replaced by a plurality of cylindrical electrodes 100–1 through 100–$n$ and 101–1 through 101–$n$ arranged in rows spaced above electrode 68. The longitudinal axis of each electrode 100 and 101 is perpendicular to the surface of electrode 68 and therefore to the surface of substrate 1 as the latter passes through the spark discharge zone formed in the region between electrodes 100 and 101 and electrode 68. The electrodes may be constructed of any one of a number of suitable materials such as tantalum or stainless steel formed into cylinders with 0.010 inch walls and 0.125 inch outer diameter. The electrodes are mounted in plate 72 and spaced apart by about 0.25 inch. Although two rows of tubular electrodes are illustrated, it is to be understood that either a single row or additional rows may be employed if desired.

Each electrode 100–1 through 100–$n$ and 101–1 through 101–$n$ is connected through a corresponding current control circuit 30–1 through 30–$n$ and 31–1 through 31–$n$ to one side of the secondary winding of transformer 93 of power supply 94 via lead 92, where each control circuit 30 and 31 may comprise a selected impedance element or elements such as a capacitor or a capacitor and an inductor. Return lead 92$a$ from electrode 68 is connected to the other side of the secondary winding of transformer 93 through element 99 which may be an inductor.

Initiator gas is supplied to the spark discharge zone through the interior of each electrode 100 and 101 from supply tanks 105 and 109, respectively, via corresponding feed lines 103 and 107. Valves 110 and 111 indicate that other gases may be supplied (from sources not shown) together with the gas from tank 109. By appropriate adjustment of power supply 94 and gas flow rate from supply tanks 105 and 109, a spark discharge is maintained between electrodes 100, 101 and electrode 68. By moving a substrate through the spark discharge zone, grafting results similar to those described above were obtained. Additionally, it was found that a substrate comprising a relatively porous fabric such as Vycron polyester chafer fabric could be moved through the spark discharge zone, without requiring an insulating boot to prevent damage to the fabric, when helium was used as the initiator gas, either alone or in combination with hydrogen or nitrogen. Thus the arrangement shown in FIG. 3 is particularly useful for activating the surface of a fabric substrate and provides the additional advantage of eliminating the necessity for a boot.

Figure 4:
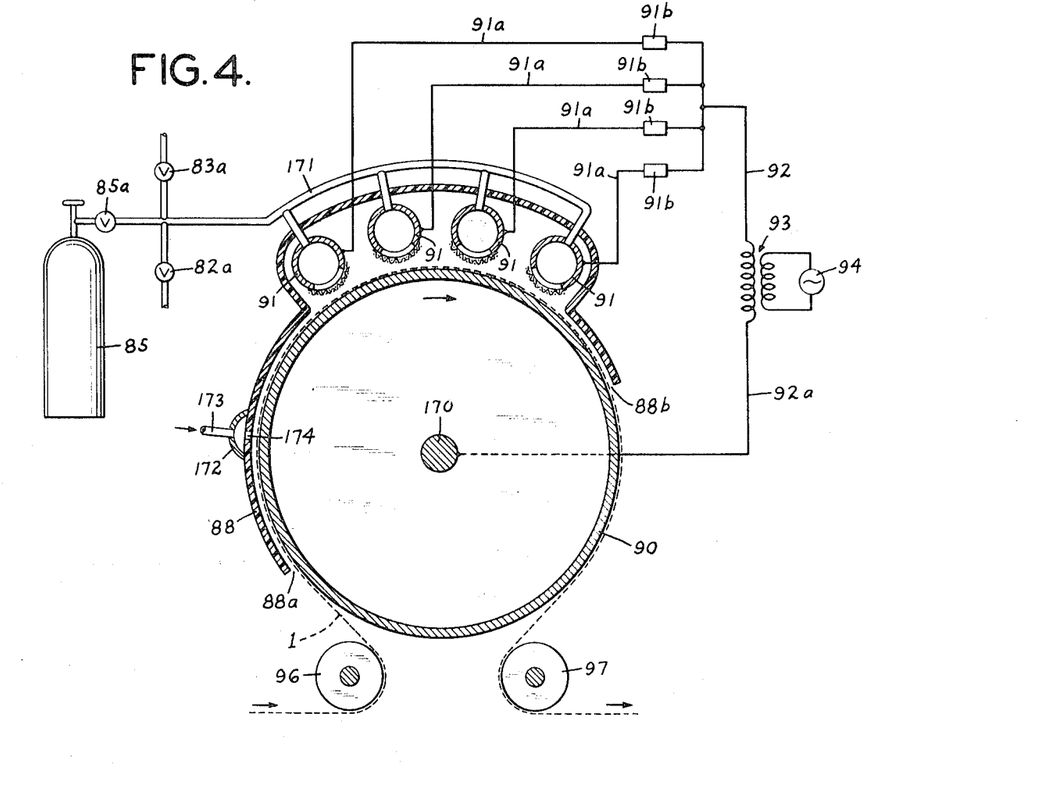
FIG. 4 is a sectional view of another embodiment, in which a substrate is moved along a cylindrical path through a spark discharge zone in accordance with the principles of the present invention.

Referring next to FIG. 4, in this drawing there is shown a cylindrical drum electrode 90 which is rotatably mounted on a journaled shaft 170, and counter electrodes 91, similar to counter electrode 20 in FIG. 1, positioned around the periphery of drum electrode 90. An enclosure 88 surrounding electrodes 91 forms a gas tight enclosure except for substrate entrance and exit slots 88$a$ and 88$b$ respectively. Initiator gas is supplied to the interior of each electrode 91 by feed line 171 connected via valve 85$a$ to tank 85, other gas supply sources (not shown) being connected to line 171 by way of valves 83$a$, 82$a$. A potential difference is applied between electrodes 90 and 91 by means of individual leads 91$a$ connected through control circuits 91$b$ to lead 92 from one side of the secondary winding of transformer 93 of power supply 94, and lead 92$a$ from shaft 170 to the other side of the secondary winding of transformer 92$a$.

Substrate 1 passes through entrance slot 88$a$ over entrance guide roller 96 into the spark discharge zone between electrodes 91 and 90, and passes out of exit slot 88$b$ over exit roller 97. Slots 88$a$ and 88$b$ are sufficiently narrow to prevent significant amounts of air from entering the spark discharge zone between electrodes 90, 91. The entrance shield of enclosure 88 is shown to be longer than the exit shield since the moving substrate tends to drag in air with it. If desired, elimination of external air may be further enhanced by injecting additional initiator gas through the entrance shield of enclosure 88 by means of transverse slot 174 covered by semicylinder 172 and connected to gas line 173 from a suitable source (not shown). An additional important feature of the apparatus of FIG. 4 is the rotatability of electrode 90, which eliminates sliding friction between substrate 1 and electrode 90 by having electrode 90 move with substrate 1 as it enters the apparatus and contacts drum 90. In this way, the surfaces of low tensile strength substrates such as polyethylene film may be treated without damaging or breaking the substrate.

Figure 5:
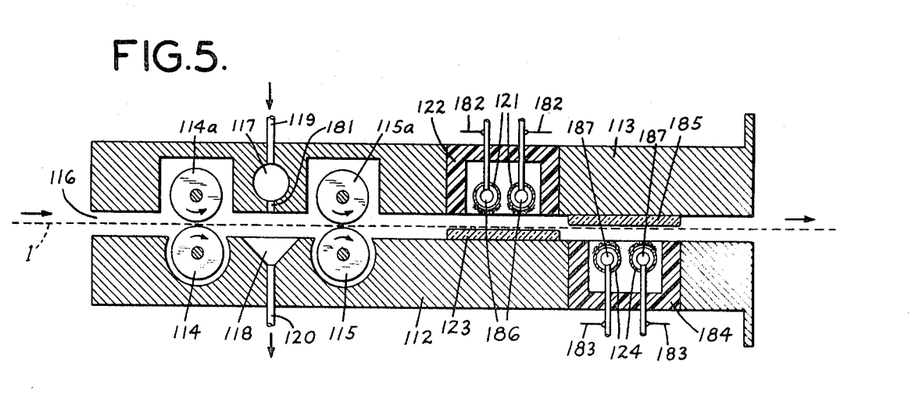
FIG. 5 is a sectional view of an embodiment of the principles of this invention in which both sides of a sheet of polymer are treated.

FIG. 5 illustrates another arrangement for eliminating unwanted air in the spark discharge zone. By passing an incoming substrate 1 through squeeze roller pairs 114, 114$a$ and 115, 115$a$ mounted in bottom and top plates 112, 113, the flow of air or other unwanted gases dragged in on the surface of moving substrate 1 is restricted. Rollers 114 and 115 can be driven at a selected angular speed to move substrate 1 at a desired linear speed through the two spark discharge zones shown. Opposing rollers 114$a$ and 115$a$ may use bearings that are spring loaded in a direction to squeeze the interevning substrate 1.

The apparatus shown in FIG. 5 is also designed to eliminate air or other unwanted gases trapped in the interstices of porous substrates. This is accomplished by injecting a desired inert or other nonreactive gas from line 119 into cavity 117 through transverse slot 181 in top plate 113, thereby to flow through the pores in substrate 1 and carry out of exit slot 118 and line 120 in plate 112 the unwanted gas or gases trapped in the pores. If desired, nitrogen can be injected through line 119 to eliminate the oxygen component of air trapped in the substrate interstices.

The apparatus illustrated in FIG. 5 is further adapted to treat both surfaces of a substrate. One side of substrate 1 is treated by the spark discharge zone formed between electrodes 121, which may be of a design similar to the electrode 70 shown in FIG. 2, and base plate 112. Initiator gas is supplied to the spark discharge zone through gas nozzles 186 in the interiors of electrodes 121, and electrodes 121 are electrically isolated from top plate 113 by insulator 122 so that for convenience of construction both top plate 113 and bottom plate 112 may be maintained at ground potential. A spark discharge is maintained between electrodes 121 and bottom plate 112 by a power supply (not shown) connected to leads 182 on conducting nozzles 186. A dielectric coating 123, for example, porcelain, on the portion of bottom plate 112 opposing electrodes 121 eliminates spark damage to a porous substrate by limiting the current in the pores of the substrate.

Treatment of the other side of substrate 1 is accomplished in a second spark discharge zone formed between electrodes 124 and top plate 113, the portion of plate 113 opposing electrodes 124 being coated with a selected dielectric 185. Electrodes 124 are electrically isolated from plate 112 by insulator 184, and a desired initiator gas is injected into the second spark discharge zone by nozzles 187 supplied from a source not shown. Leads 183 attached to nozzles 187 are connected to one side of a power supply, also not shown, thereby to maintain the spark discharge between electrodes 124 and 113.

Although electrodes 121 and 124 are shown in pairs, it is to be understood that a single electrode as shown in FIG. 2, or cylindrical electrodes as shown in FIG. 3, may be employed if desired. Of course, with cylindrical electrodes, dielectric coatings 123 and 185 are not needed for treating porous substrates. Also, although not shown, it is to be understood that plates 112 and 113 may be equipped with cooling or heating coils in order to treat the substrate at a controlled temperature.

Figure 6:
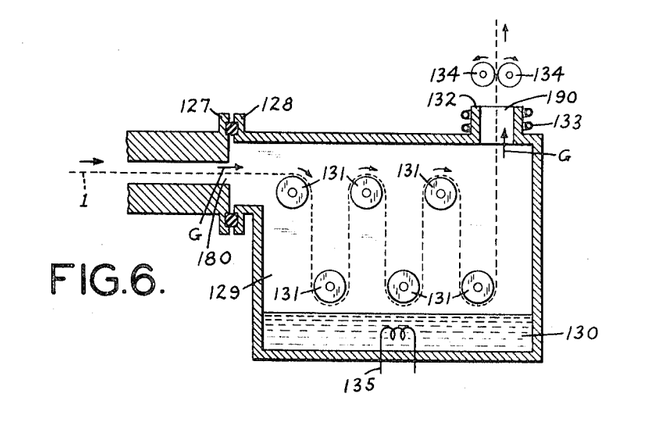
FIG. 6 is a sectional view of apparatus for applying a grafting material to a substrate treated by the spark discharge process of this invention.

Turning to FIG. 6, this drawing illustrates equipment for grafting a substrate after it has been treated in accordance with the principles of this invention, that is, this equipment may be employed in combination with the apparatus illustrated in any of the drawings FIGS. 1 through 5 previously described. After substrate 1 leaves the exit aperture 180 of the spark discharge treatment apparatus, it is lead into grafting enclosure 129 which is hermetically secured to the treatment apparatus, for example, by mating flanges 127 and 128. Initiator gas G leaving the treatment apparatus is allowed to enter grafting enclosure 129 together with the treated substrate so that as the initiator gas flows through enclosure 129 and out of exit slot 190 it will block the back flow of air which might otherwise interfere with the grafting operation.

Within enclosure 129, free radical reactive substance 130, for example, a selected monomer, is heated by coils 135 so that it vaporizes, and as treated substance 1 is guided through enclosure 129 by guide rolls 131, the free radical reactive vapor condenses on the substrate. Because of the free radicals present on either or both of the substrate surfaces as a result of the prior spark discharge treatment, the condensed vapor reacts with these free radicals to form a polymer graft on the treated surface or surfaces of the substrate. The grafted substrate leaves enclosure 129 though exit slot 190 in tower 132, tower 132 being provided with cooling coils 133 to condense any gaseous free radical reactive substance and thereby prevent it from escaping from enclosure 129. Squeeze rolls 134 remove ungrafted substance clinging to the surfaces of the substrate.

Free radical reactive substance 130 in enclosure 129 may be any one of a number of substances, including both ethylenically unsaturated compounds and non-ethylenically unsaturated compounds. Examples of reactive substances which may be suitable may include methacrylic acid, styrene, acrylonitrile, vinylidene chloride, isoprene, vinyl acetate, dodecafluoroheptyl-alcohol, and nitrogen dioxide ($NO_2$). After grafting, various chemical treatments can be used to change surface properties, for example, the acrylic acid can be converted to a salt, and the vinyl acetate can be hydroxylated and cross-linked with formaldehyde.

Figure 7:
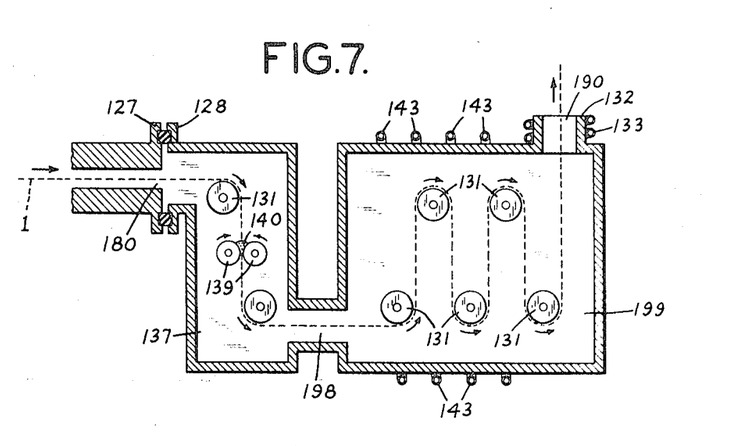
FIG. 7 is a sectional view of apparatus alternative to that shown in FIG. 6.

In the event that it is desired to apply the free radical reactive substance in liquid form to the treated substrate, thereby avoiding the heating equipment necessary for vaporizing the substance, the apparatus shown in FIG. 7 may be employed. The treated substrate 1 is lead over guide roll 131 into an applicator chamber 137 containing a pair of squeeze rollers 139 designed to hold a liquid free radical reactive substance, for example, a liquid monomer. The treated substrate is passed through rollers 139 so that a controlled amount of liquid 140 is applied to the surfaces of the treated substrate, thereby to form a graft polymer on the treated surface or surfaces of the substrate. From applicator chamber 137 the grafted substrate is passed through port 198 into heating chamber 199 which is maintained at a controlled temperature by coils 143. Within chamber 199, the grafted substrate is directed along a predetermined path by guide rolls 131 to exit port 190 in cooling tower 132 provided with cooling coils 133.

In certain situations, it may not be desirable or convenient to perform the grafting operation immediately following the spark discharge treatment. In such cases, the treated substrate may be exposed to air or an oxygen bearing gas as the free radical reactive substance in order to form peroxides on the treated surface or surfaces of the substrate. Subsequent grafting may then be performed by heating the peroxidized substrate to decompose the peroxides and exposing the substrate to the grafting substance, for example, by processing the substance after peroxide decomposition in the manner shown in FIGS. 6 and 7 and described above.

Other substrates which may be treated in accordance with this invention include:

(1) Polymers of the following types:
  Polyacrylonitrile
  Polyvinyl chloride
  Polytetrafluoroethylene
  Polymonochlorotrifluoroethylene
(2) Elastomers polymerized from:
  Butadieneacrylonitrile
  Styrenebutadiene
  Isobutylene
  Ethylenepropylene polymers and copolymers.
(3) Natural cellulose products such as:
  Cotton
  Wood
  and
(4) Proteinaceous products such as wool.

Substrates formed from these materials may be extruded or cast films, nonwoven fibrous products, or woven or knit fabrics formed from staple fiber yarn or continuous filament yarn.

Monomers to be grafted after spark discharge processing are in general ones with carbon-carbon unsaturation, both monofunctional and difunctional. Monomers containing polar functional groups such as those in organic acids can be grafted to increase hydrophilic properties of substrates, for example, greater wicking on textile fabrics. On the other hand, less polar monomers can be grafted to produce hydrophobic properties, such as, for example, by using fluorinated hydrocarbons to produce oil repellency on fabrics. Also, organic acids and bases can be grafted to substrates to improve dye reception of basic and acid dyes, respectively. Hydroxylated monomers can be grafted to improve reception of textile fabric to dispersed dyes. Also, adhesion of the substrate to various coatings including epoxy type top coatings can be improved by grafting compatible monomers. When unsaturation is present in the coating material, such as in the resorcinol type described in the copending application by Tomasino and Lake, Ser. No. 495,781, filed Oct. 14, 1965, argon treated chafer fabric has provided adhesion to the tear strength of the latex described in the above-mentioned Lake and Tomasino application. Finally, substrate surfaces may be treated after grafting to provide a variety of useful properties: For example; the acrylic acid may be converted to a salt to increase its conductivity for use as an antistatic agent on fabrics, and grafted hydroxylated monomers may be cross-linked to improve anti-crease properties on fabrics or to raise surface melting temperatures.

While the invention has been described in connection with specific embodiments thereof and in specific uses, various modifications thereof will occur to those skilled in the art without departing from the spirit and scope of the invention as set forth in the appended claims.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. The method of free radical initiation of a polymer graft to an organic polymeric substrate which comprises subjecting a substrate selected from the group consisting of polyolefins, polyesters, polyamides, and cellulosic and proteinaceous products to a spark discharge in a zone of free radical initiating gas selected from the group consisting of argon, hydrogen, helium, a mixture of argon and hydrogen, and a mixture of helium and hydrogen to generate free radical sites on the surface of said substrate, and subsequently exposing said substrate to an ethylenically unsaturated monomer.

2. The method as set forth in claim 1 wherein said free radical reactive substance is acrylic acid.

3. A process according to claim 1 wherein the substrate is film.

4. A process according to claim 1 wherein the substrate is fabric.

5. The article produced according to the process of claim 1.

6. The article produced according to the process of claim 2.

7. The article produced according to the process of claim 3.

8. The article produced according to the process of claim 4.

9. The method of improving the wetability of an organic polymeric substrate as measured by its wetting angle, which comprises activating the surface of an organic polymeric substrate selected from the group consisting of polyolefins, polyesters, polyamides, and cellulosic and proteinaceous products by subjecting it to an electric discharge in a zone of a free radical initiating gas selected from the group consisting of argon and a mixture of argon and hydrogen, and subsequently exposing the activated polymeric substrate to acrylic acid to form a graft copolymer of the substrate and polyacrylic acid.

10. The method as set forth in claim 9 wherein the substrate is a polyester fabric.

11. The method as set forth in claim 9 wherein the substrate is a fabric formed by a mixture of polyester and cotton.

12. The method as set forth in claim 9 wherein the acrylic acid is vaporized and then condensed upon the substrate.

References Cited

UNITED STATES PATENTS 3,179,482  4/1965  Kassenbeck _______ 8—2

ROBERT K. MIHALEK, Primary Examiner

U.S. Cl. X.R.

8—4, 30, 115.5, 116, 116.2, 127.6, 128, 168; 117—47, 93.1, 138.8; 204—165, 168

UNITED STATES PATENT OFFICE
CERTIFICATE OF CORRECTION

Patent No. 3,600,122          Dated August 17, 1971

Inventor(s) John H. Coleman

It is certified that error appears in the above-identified patent and that said Letters Patent are hereby corrected as shown below:

In the heading to the printed specification, line 6, for "Surface Aviation Corporation" read -- Surface Activation Corporation --. Column 1, line 12, for "P" read -- J --. Column 2, line 41, for "appartus" read -- apparatus --. Column 5, line 36, after "there" insert -- were --. Column 8, Table 9, line 71, ater "Wetting angle", for "percent" read -- degrees --. Column 10, line 41, for "interevning" read -- intervening --. Column 11, line 21, for "lead" read -- led --; line 61, for "lead" read -- led --. Column 13, line 14, for "free radical reactive substance" read -- ethylenically unsaturated monomer --. Column 14, after "References Cited" add the following:

| | | |
|---|---|---|
| 2,956,899 | 10/1960 | Cline |
| 3,018,189 | 1/1962 | Traver |
| 3,069,283 | 12/1962 | Coleman |
| 3,171,539 | 3/1965 | Holbrook et al |
| 3,188,229 | 6/1965 | Graham |
| 3,255,099 | 6/1966 | Wolinski |
| 3,274,088 | 9/1966 | Wolinski |
| 3,274,089 | 9/1966 | Wolinski |
| 3,274,090 | 9/1966 | Amborski |
| 3,274,091 | 9/1966 | Amborski |
| 3,284,331 | 11/1966 | McBride et al |
| 3,391,044 | 7/1968 | Kaghan et al |
| 3,397,132 | 8/1968 | Wolinski |

Other References:

R. F. Grossman et al, J. of APPLIED POLYMER SCIENCE Vol. II, Issue No. 5 (1959) pp. 163-5

Y. Shinohara et al, J. of POLYMER SCIENCE, Vol. XLIV, 1960, pp. 195-211

Signed and sealed this 2nd day of July 1974.

(SEAL)
Attest:

EDWARD M. FLETCHER, JR.
Attesting Officer

C. MARSHALL DANN
Commissioner of Patents